US007772173B2

(12) United States Patent
Nakagawa

(10) Patent No.: US 7,772,173 B2

(45) Date of Patent: Aug. 10, 2010

(54) RINSING COMPOSITION, AND METHOD FOR RINSING AND MANUFACTURING SILICON WAFER

(75) Inventor: Hiroyuki Nakagawa, Aichi (JP)

(73) Assignee: Fujimi Incorporated, Kiyosu-shi, Aichi (JP)

(*) Notice: Subject to any disclaimer, the term of this patent is extended or adjusted under 35 U.S.C. 154(b) by 690 days.

(21) Appl. No.: 11/155,389

(22) Filed: Jun. 16, 2005

(65) Prior Publication Data

US 2005/0282718 A1 Dec. 22, 2005

(30) Foreign Application Priority Data

Jun. 18, 2004 (JP) ............................ 2004-181573

(51) Int. Cl.
*C09K 3/14* (2006.01)

(52) U.S. Cl. ....................... 510/175; 252/79.1; 438/692

(58) Field of Classification Search ................. 510/175; 252/79.1; 438/692
See application file for complete search history.

(56) References Cited

U.S. PATENT DOCUMENTS

| | | | | |
|---|---|---|---|---|
| 3,715,842 | A | 2/1973 | Tredinnick et al. | 51/281 |
| 4,169,337 | A | 10/1979 | Payne | 51/283 |
| 4,462,188 | A | 7/1984 | Payne | 51/283 |
| 4,588,421 | A | 5/1986 | Payne | 51/308 |
| 5,230,833 | A | 7/1993 | Romberger et al. | 252/363.5 |
| 5,352,277 | A | 10/1994 | Sasaki | 106/6 |
| 5,916,819 | A | 6/1999 | Skrovan et al. | 438/692 |
| 6,099,604 | A | 8/2000 | Sandhu et al. | 51/307 |
| 6,248,880 | B1 * | 6/2001 | Karlson | 536/91 |
| 6,454,820 | B2 | 9/2002 | Hagihara et al. | 51/308 |
| 6,568,996 | B2 * | 5/2003 | Kobayashi et al. | 451/36 |
| 6,852,009 | B2 | 2/2005 | Kawase et al. | 451/36 |
| 2001/0003672 | A1 * | 6/2001 | Inoue et al. | 438/690 |
| 2002/0052064 | A1 * | 5/2002 | Grabbe et al. | 438/113 |
| 2004/0098924 | A1 * | 5/2004 | Iwasa | 51/302 |
| 2004/0127047 | A1 * | 7/2004 | Yamada et al. | 438/690 |
| 2005/0054203 | A1 | 3/2005 | Yamada | 438/695 |
| 2006/0124586 | A1 * | 6/2006 | Kobayashi et al. | 216/41 |

FOREIGN PATENT DOCUMENTS

| | | |
|---|---|---|
| JP | 11-330024 A1 | 11/1999 |
| JP | 2003-109931 | 4/2003 |
| WO | 99/32570 | 7/1999 |
| WO | 2004/042812 A1 | 5/2004 |

* cited by examiner

*Primary Examiner*—Gregory E Webb
(74) *Attorney, Agent, or Firm*—Vidas, Arrett & Steinkraus

(57) ABSTRACT

A rinsing composition contains at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to the copolymer. The rinsing composition can be advantageously used in rinsing polished silicon wafers.

14 Claims, No Drawings

RINSING COMPOSITION, AND METHOD FOR RINSING AND MANUFACTURING SILICON WAFER

BACKGROUND OF THE INVENTION

The present invention relates to a rinsing composition for use in rinsing silicon wafers and the like, a method for rinsing silicon wafers using such a rinsing composition, and a method for manufacturing silicon wafers using such a rinsing composition.

When a silicon wafer is polished using a polishing composition, abrasive grains and the like contained in the polishing composition generally adhere to the polished silicon wafer. The abrasive grains adhering to the silicon wafer lead to various disadvantages and hence, generally, the polished silicon wafer is rinsed with a rinsing composition to remove the abrasive grains (see, for example, Japanese Laid-Open Patent Publication No. 2003-109931). Therefore, the rinsing composition is required to surely remove the abrasive grains adhering to the surface of the silicon wafer. In this regard, it should be noted that foreign matter is likely to adhere to the rinsed silicon wafer having poor surface wettability and therefore it is important that the rinsing composition allows the rinsed silicon wafer to maintain excellent surface wettability. However, conventional rinsing compositions do not satisfactorily meet this requirement and improvement of the compositions is desired.

SUMMARY OF THE INVENTION

Accordingly, an object of the present invention is to provide a rinsing composition which can be advantageously used in rinsing polished silicon wafers. Another object of the present invention is to provide a method for rinsing polished silicon wafers using such a rinsing composition and a method for manufacturing silicon wafers using such a rinsing composition.

To achieve the foregoing and other objectives and in accordance with the purpose of the present invention, a rinsing composition is provided. The rinsing composition contains at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer, and water.

The present invention provides a method for rinsing a silicon wafer. The method includes preparing the above rinsing composition and rinsing, using the prepared rinsing composition, a silicon wafer polished using a polishing composition.

Further, the present invention provides a method for manufacturing a silicon wafer. The method includes polishing a semi-manufactured silicon wafer using a polishing composition and rinsing the polished semi-manufactured silicon wafer, by using the above rinsing composition.

The present invention provides another rinsing composition. The rinsing composition consists essentially of at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer, and water.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Herein below, an embodiment of the present invention will be described.

A rinsing composition according to the present embodiment consists essentially of a water-soluble polymer and water. A water-soluble polymer to be contained in the rinsing composition is a water-soluble polysaccharide, polyvinyl alcohol, polyethylene oxide, polypropylene oxide, a copolymer of ethylene oxide and propylene oxide, or a hydrophilic polymer obtained by adding an alkyl group or an alkylene group to the copolymer. Water to be contained in the rinsing composition contains preferably essentially no impurities, and may be distilled water, pure water, or ultrapure water.

When a rinsing composition according to the present embodiment is used in rinsing a polished silicon wafer, the generation of a protruding defect called a particle on the surface of the rinsed silicon wafer is suppressed. The reason for this is presumed to be that the water-soluble polymer contained in the rinsing composition causes the rinsed silicon wafer to maintain excellent surface wettability, thus preventing foreign matter from adhering to the surface of the rinsed silicon wafer, or preventing foreign matter attached to the surface of the wafer from being dried to stick to the surface of the wafer.

From the viewpoint of more surely preventing the generation of particles, a water-soluble polysaccharide to be contained in the rinsing composition is preferably hydroxyethyl cellulose or pullulan, and more preferably hydroxyethyl cellulose.

A water-soluble polymer to be contained in the rinsing composition is preferably hydroxyethyl cellulose, pullulan, polyvinyl alcohol, polyethylene oxide, polypropylene oxide, or a copolymer of ethylene oxide and propylene oxide, more preferably hydroxyethyl cellulose, polyvinyl alcohol, polyethylene oxide, or a copolymer of ethylene oxide and propylene oxide, and most preferably hydroxyethyl cellulose, polyethylene oxide, or a copolymer of ethylene oxide and propylene oxide.

When the rinsing composition contains the water-soluble polymer only in a small amount, the surface of the rinsed silicon wafer may be unsatisfactorily hydrophilic, making it difficult to prevent foreign matter from adhering to the surface of the rinsed silicon wafer. Therefore, from the viewpoint of making the water-soluble polymer effectively exhibit its particle prevention effect, the content of the water-soluble polymer in the rinsing composition has a preferred range.

Specifically, when the water-soluble polymer contained in the rinsing composition is a water-soluble polysaccharide, the content of the water-soluble polymer in the rinsing composition is preferably 0.0005% by mass or more, more preferably 0.002% by mass or more, and most preferably 0.005% by mass or more. When the water-soluble polymer contained in the rinsing composition is polyvinyl alcohol, the content of the water-soluble polymer in the rinsing composition is preferably 0.0001% by mass or more, more preferably 0.0005% by mass or more, and most preferably 0.002% by mass or more. When the water-soluble polymer contained in the rinsing composition is polyethylene oxide, the content of the water-soluble polymer in the rinsing composition is preferably 0.0001% by mass or more, more preferably 0.0005% by mass or more, and most preferably 0.001% by mass or more. When the water-soluble polymer contained in the rinsing composition is polypropylene oxide, the content of the water-soluble polymer in the rinsing composition is preferably 0.0005% by mass or more, more preferably 0.002% by mass or more, and most preferably 0.005% by mass or more. When the water-soluble polymer contained in the rinsing composition is a copolymer of ethylene oxide and propylene oxide, the content of the water-soluble polymer in the rinsing composition is preferably 0.0005% by mass or more, more preferably 0.001% by mass or more, and most preferably 0.002% by mass or more. When the water-soluble polymer contained in the rinsing composition is a hydrophilic polymer obtained by adding an alkyl group or an alkylene group to a copolymer of ethylene oxide and propylene oxide, the content of the water-soluble polymer in the rinsing composition is preferably 0.0005% by mass or more, more preferably 0.001% by mass or more, and most preferably 0.005% by mass or more.

On the other hand, when the rinsing composition contains the water-soluble polymer in a large amount, the viscosity of the rinsing composition may increase excessively. Therefore, from the viewpoint of rendering the viscosity of the rinsing composition appropriate, the content of the water-soluble polymer in the rinsing composition has a preferred range.

Specifically, when the water-soluble polymer contained in the rinsing composition is a water-soluble polysaccharide, the content of the water-soluble polymer in the rinsing composition is preferably 1.5% by mass or less, more preferably 0.8% by mass or less, and most preferably 0.5% by mass or less. When the water-soluble polymer contained in the rinsing composition is polyvinyl alcohol, the content of the water-soluble polymer in the rinsing composition is preferably 2% by mass or less, more preferably 1% by mass or less, and most preferably 0.5% by mass or less. When the water-soluble polymer contained in the rinsing composition is polyethylene oxide, the content of the water-soluble polymer in the rinsing composition is preferably 1% by mass or less, more preferably 0.5% by mass or less, and most preferably 0.2% by mass or less. When the water-soluble polymer contained in the rinsing composition is polypropylene oxide, the content of the water-soluble polymer in the rinsing composition is preferably 2% by mass or less, more preferably 0.5% by mass or less, and most preferably 0.2% by mass or less. When the water-soluble polymer contained in the rinsing composition is a copolymer of ethylene oxide and propylene oxide, the content of the water-soluble polymer in the rinsing composition is preferably 0.5% by mass or less, more preferably 0.2% by mass or less, and most preferably 0.1% by mass or less. When the water-soluble polymer contained in the rinsing composition is a hydrophilic polymer obtained by adding an alkyl group or an alkylene group to a copolymer of ethylene oxide and propylene oxide, the content of the water-soluble polymer in the rinsing composition is preferably 0.5% by mass or less, more preferably 0.2% by mass or less, and most preferably 0.1% by mass or less.

When the compound contained as a water-soluble polymer in the rinsing composition has too small an average molecular weight, the generation of particles on the surface of the rinsed silicon wafer may not be prevented. Therefore, from the viewpoint of making the water-soluble polymer effectively exhibit its particle prevention effect, the average molecular weight of the compound to be contained as the water-soluble polymer in the rinsing composition has a preferred range.

Specifically, the average molecular weight of the water-soluble polysaccharide is preferably 30,000 or more, more preferably 60,000 or more, and most preferably 90,000 or more. The average molecular weight of the polyvinyl alcohol is preferably 1,000 or more, more preferably 5,000 or more, and most preferably 10,000 or more. The average molecular weight of the polyethylene oxide is preferably 20,000 or more. The average molecular weight of the polypropylene oxide is preferably 1,000 or more, more preferably 8,000 or more, and most preferably 15,000 or more. The average molecular weight of the copolymer of ethylene oxide and propylene oxide is preferably 500 or more, more preferably 2,000 or more, and most preferably 6,000 or more. The average molecular weight of the hydrophilic polymer obtained by adding an alkyl group or an alkylene group to a copolymer of ethylene oxide and propylene oxide is preferably 1,000 or more, more preferably 7,000 or more, and most preferably 14,000 or more.

On the other hand, when the compound contained as a water-soluble polymer in the rinsing composition has too large an average molecular weight, the viscosity of the rinsing composition may increase excessively. Therefore, from the viewpoint of rendering the viscosity of the rinsing composition appropriate, the average molecular weight of the compound to be contained as the water-soluble polymer in the rinsing composition has a preferred range.

Specifically, the average molecular weight of the water-soluble polysaccharide is preferably 3,000,000 or less, more preferably 2,000,000 or less, and most preferably 1,500,000 or less. The average molecular weight of the polyvinyl alcohol is preferably 1,000,000 or less, more preferably 500,000 or less, and most preferably 300,000 or less. The average molecular weight of the polyethylene oxide is preferably 50,000,000 or less, more preferably 30,000,000 or less, and most preferably 10,000,000 or less. The average molecular weight of the polypropylene oxide is 1,000,000 or less, more preferably 500,000 or less, and most preferably 250,000 or less. The average molecular weight of the copolymer of ethylene oxide and propylene oxide is preferably 100,000 or less, more preferably 50,000 or less, and most preferably 20,000 or less. The average molecular weight of the hydrophilic polymer obtained by adding an alkyl group or an alkylene group to a copolymer of ethylene oxide and propylene oxide is preferably 150,000 or less, more preferably 100,000 or less, and most preferably 30,000 or less.

When polyvinyl alcohol contained as a water-soluble polymer in the rinsing composition has too small an average degree of polymerization, the generation of particles on the surface of the rinsed wafer may not be prevented. Conversely, when the polyvinyl alcohol has too large an average degree of polymerization, the viscosity of the rinsing composition may increase excessively. Therefore, the average degree of polymerization of the polyvinyl alcohol to be contained in the rinsing composition is preferably 200 to 3,000. In addition, the saponification value of the polyvinyl alcohol affects the properties of the rinsing composition, and the saponification value of the polyvinyl alcohol is preferably 70 to 100%.

A rinsing composition according to the present embodiment is used in, for example, rinsing polished silicon wafers. It is preferred that the polishing composition for use in polishing silicon wafers contains a water-soluble polymer of the same type as the water-soluble polymer contained in the rinsing composition for use in the subsequent rinsing. In other words, it is preferred that the water-soluble polymer to be contained in the rinsing composition is of the same type as the water-soluble polymer contained in the polishing composition for use in polishing silicon wafers. In this case, there is no possibility that the water-soluble polymer in the polishing composition remaining on the silicon wafer inhibits the water-soluble polymer in the rinsing composition from appropriately acting during the rinsing.

The embodiments may be modified as follows.

A rinsing composition according to the above embodiment may contain two types or more of water-soluble polymers selected from hydroxyethyl cellulose, polyvinyl alcohol, polyethylene oxide, polypropylene oxide, a copolymer of ethylene oxide and propylene oxide, and a hydrophilic polymer obtained by adding an alkyl group or an alkylene group to the copolymer, and pullulan.

A rinsing composition according to the above embodiment may further contain an alkaline compound. An alkaline compound improves the solubility of the water-soluble polymer in the rinsing composition. It is preferred that the alkaline compound to be contained in the rinsing composition contains at least one selected from the group consisting of an inorganic alkaline compound, such as potassium hydroxide, sodium hydroxide, potassium hydrogencarbonate, potassium carbonate, sodium hydrogencarbonate, and sodium carbonate; ammonia; an ammonium salt, such as tetramethylammonium hydroxide, ammonium hydrogencarbonate, and ammonium carbonate; and an amine, such as methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, anhydrous piperazine, piperazine hexahydrate, 1-(2-aminoethyl)piperazine, and N-methylpiperazine.

When the rinsing composition contains an alkaline compound in a large amount, many recessed defects called COPs (crystal originated particles) may be formed in the surface of the rinsed silicon wafer. Therefore, from the viewpoint of reducing the COPs in the rinsed silicon wafer, the amount of the alkaline compound contained in the rinsing composition is preferably less than 0.5 times, more preferably less than 0.2 times, and most preferably 0.05 times or less the mass of the water-soluble polymer contained in the rinsing composition. However, in the case where a particularly high surface quality is required to the rinsed silicon wafer, the rinsing composition contains preferably essentially no alkaline compounds.

A rinsing composition according to the above embodiment may further contain a chelating agent. A chelating agent forms a complex ion together with a metal impurity contained in the rinsing composition to capture it, thus suppressing pollution of the silicon wafer. The metal impurity used here particularly means iron, nickel, copper, calcium, chromium, zinc, or a hydroxide or an oxide thereof. These metal impurities may adhere to the surface of a wafer or disperse into a wafer to adversely affect the electrical properties of a semiconductor device produced from the wafer.

It is preferred that the chelating agent to be contained in the rinsing composition contains at least one selected from the group consisting of nitrilotriacetic acid, ethylenediaminetetraacetic acid, hydroxyethylenediaminetetraacetic acid, propanediaminetetraacetic acid, diethylenetriaminepentaacetic acid, triethylenetetraminehexaacetic acid, ethylenediaminetetraethylenephosphonic acid, ethylenediaminetetramethylenephosphonic acid, ethylenediaminetetrakismethylenephosphonic acid, diethylenetriaminepentaethylenephosphonic acid, diethylenetriaminepentamethylenephosphonic acid, triethylenetetraminehexaethylenephosphonic acid, triethylenetetraminehexamethylenephosphonic acid, propanediaminetetraethylenephosphonic acid, propanediaminetetramethylenephosphonic acid, and a salt of the above acid, such as an ammonium salt, a potassium salt, a sodium salt, and a lithium salt.

The rinsing composition containing a chelating agent in a large amount easily suffers gelation. Therefore, from the viewpoint of preventing the rinsing composition from suffering gelation, the content of the chelating agent in the rinsing composition is preferably 6% by mass or less, more preferably 3% by mass or less, and most preferably 1% by mass or less.

When the chelating agent contains an alkaline compound, such as an ammonium salt, a potassium salt, a sodium salt, and a lithium salt, and the rinsing composition further contains another alkaline compound, it is preferred that the total amount of the alkaline compounds contained in the rinsing composition is less than 0.5 times the mass of the water-soluble polymer contained in the rinsing composition.

A rinsing composition according to the above embodiment may further contain an additive other than the alkaline compound and chelating agent, for example, a preservative or a surfactant.

A rinsing composition according to the above embodiment may be prepared by diluting a stock solution.

A rinsing composition according to the above embodiment may be used in rinsing an object other than silicon wafers.

A rinsing composition according to the above embodiment may be utilized as a washing for use in scrubbing rinsed silicon wafers.

Next, the present invention will be described in more detail with reference to the following Examples and Comparative Examples.

Examples 1 to 15 and Comparative Examples 1 to 5

A water-soluble polymer and water were mixed together and, an alkaline compound, a chelating agent, or an abrasive grain was added as needed to prepare stock solutions of rinsing compositions. Then, the stock solutions were individually diluted with water so that the amount of the solution became 20 times greater to prepare rinsing compositions according to Examples 1 to 15 and Comparative Examples 1 to 4. The types and contents of the water-soluble polymer, alkaline compound, chelating agent, and abrasive grain in each rinsing composition are shown in Table 1.

A silicon wafer (P-<100>) having a diameter of 6 inches (about 150 mm) was polished using a polishing machine while feeding a polishing composition. After the polishing, the conditions of the polishing machine were changed to those for rinsing and, instead of the polishing composition, any one of the rinsing compositions according to Examples 1 to 15 and Comparative Examples 1 to 4 and pure water (Comparative Example 5) was fed to the polishing machine to rinse the polished silicon wafer. The conditions for polishing the silicon wafer and the conditions for rinsing the polished silicon wafer are shown in Table 2.

With respect to each of the rinsed silicon wafers, the surface wettability was visually examined and the result was evaluated in accordance with the following four criteria. Specifically, a wafer in which no water repellency was recognizable on the surface was rated excellent (1), a wafer in which water repellency was recognizable only on the portion less than 5 mm from the outer edge of the wafer was rated good (2), a wafer in which water repellency was recognizable on the portion 5 mm to less than 50 mm from the outer edge of the wafer was rated slightly poor (3), and a wafer in which water repellency was recognizable on the portion 50 mm or more from the outer edge of the wafer was rated poor (4). The results of the evaluation for surface wettability are shown in the column entitled "Wettability" in Table 1.

The rinsed silicon wafers were washed with SC-1 solution (aqueous solution of ammonia hydrogen peroxide), followed by measurements of particles (>0.08 μm) and COPs (>0.08

μm) on the surfaces of the silicon wafers using a surface analyzer "AWIS3110", manufactured by ADE Corporation. The counts of the particles and COPs measured per one wafer are shown in the column entitled "Particles" and the "COPs" in Table 1, respectively.

TABLE 1

| | Water-soluble polymer [% by mass] | Alkaline compound [% by mass] | Chelating agent [% by mass] | Abrasive grain [% by mass] | Wettability | Particles [count/wafer] | COPs [count/wafer] |
|---|---|---|---|---|---|---|---|
| Example 1 | HEC*[1] 0.00125% | — | — | — | 2 | 29 | 134 |
| Example 2 | HEC*[1] 0.0125% | — | — | — | 1 | 15 | 132 |
| Example 3 | HEC*[1] 0.125% | — | — | — | 1 | 21 | 141 |
| Example 4 | HEC*[2] 0.0125% | — | — | — | 1 | 17 | 147 |
| Example 5 | HEC*[3] 0.0125% | — | — | — | 1 | 18 | 139 |
| Example 6 | PVA 0.0125% | — | — | — | 1 | 19 | 140 |
| Example 7 | PEO 0.0125% | — | — | — | 1 | 17 | 148 |
| Example 8 | EO-PO 0.0125% | — | — | — | 1 | 17 | 139 |
| Example 9 | Pullulan 0.0125% | — | — | — | 1 | 20 | 145 |
| Example 10 | HEC*[1] 0.0125% | $NH_3$ 0.013% | — | — | 1 | 37 | 183 |
| Example 11 | HEC*[1] 0.0125% | $NH_3$ 0.0058% | — | — | 1 | 21 | 152 |
| Example 12 | HEC*[1] 0.0125% | $NH_3$ 0.0015% | — | — | 1 | 25 | 142 |
| Example 13 | HEC*[1] 0.0125% | $NH_3$ 0.00036% | — | — | 1 | 19 | 137 |
| Example 14 | HEC*[1] 0.0125% | $NH_3$ 0.0015% | TTHA 0.0005% | — | 1 | 19 | 139 |
| Example 15 | HEC*[1] 0.0125% | $NH_3$ 0.0015% | EDTPO 0.0005% | — | 1 | 20 | 141 |
| C. Ex. 1 | — | — | — | $SiO_2$ 0.5% | 4 | 82 | 135 |
| C. Ex. 2 | — | $NH_3$ 0.013% | — | $SiO_2$ 0.5% | 4 | 86 | 131 |
| C. Ex. 3 | HEC*[1] 0.0125% | $NH_3$ 0.013% | — | $SiO_2$ 0.5% | 1 | 65 | 140 |
| C. Ex. 4 | HEC*[1] 0.0125% | — | — | $SiO_2$ 0.5% | — | — | — |
| C. Ex. 5 | — | — | — | — | 4 | 72 | 144 |

TABLE 2

| Polishing conditions | Rinsing conditions |
|---|---|
| Polishing machine: SPM-15 (manufactured by Fujikoshi Machinery Corp.) | Polishing machine: The same as in the left column |
| Rate of revolution of platen: 30 rpm | Rate of revolution of platen: 31 rpm |
| Polishing load: 9.4 kPa | Rinsing load: 1.1 kPa |
| Polishing pad: SURFIN 000FM (manufactured by Fujimi Incorporated) | Polishing pad: The same as in the left column |
| Feed rate of polishing composition: 0.5 L/min | Feed rate of rinsing composition or water: 10 L/min |
| Polishing time: 10 min | Rinsing time: 60 sec |

In the column entitled "Water-soluble polymer" in Table 1, "HEC*[1]" denotes hydroxyethyl cellulose having an average molecular weight of 1,200,000, "HEC*[2]" denotes hydroxyethyl cellulose having an average molecular weight of 300,000, and "HEC*[3]" denotes hydroxyethyl cellulose having an average molecular weight of 1,600,000. "PVA" denotes polyvinyl alcohol having an average molecular weight of 62,000, an average degree of polymerization of 1,400, and a saponification value of 95%, "PEO" denotes polyethylene oxide having an average molecular weight of 150,000 to 400,000, "EO-PO" denotes a copolymer of ethylene oxide and propylene oxide, which is represented by the general formula 1 below, and "Pullulan" denotes pullulan having a molecular weight of 200,000. In the column entitled "Chelating agent" in Table 1, "TTHA" denotes triethylenetetraminehexaacetic acid, and "EDTPO" denotes ethylenediaminetetrakismethylenephosphonic acid. In the column entitled "Abrasive grain" in Table 1, "$SiO_2$" indicates colloidal silica having an average particle size of 35 nm determined from a specific surface area as measured by a BET method.

$$HO\text{-}(EO)_a\text{-}(PO)_b\text{-}(EO)_c\text{-}H$$ General formula 1

In the general formula 1, EO represents an oxyethylene group, and PO represents an oxypropylene group. The ratio of the mass of the oxyethylene group in the copolymer represented by the general formula 1 to the mass of the oxypropylene group in the copolymer is 80/20. In the general formula 1, each of variables a, b, and c is an integer of 1 or more, and the ratio of (a+c) to b is 164/31.

Comparative Example 8

With respect to the polished silicon wafer which was not rinsed, evaluation of the surface wettability and measurements of the particles and COPs were conducted. The results of the evaluation and the results of the measurements are shown in Table 3.

TABLE 3

| | Wettability | Particles [count/wafer] | COPs [count/wafer] | Remarks |
|---|---|---|---|---|
| Example 16 | 1 | 29 | 136 | Rinsing for 30 sec using rinsing composition in Example 2 |
| Example 17 | 1 | 18 | 132 | Rinsing for 90 sec using rinsing composition in Example 2 |
| Comp. Ex. 6 | 3 | 49 | 145 | Rinsing for 30 sec using pure water |
| Comp. Ex. 7 | 4 | 124 | 136 | Rinsing for 90 sec using pure water |
| Comp. Ex. 8 | 1 | 60 | 150 | No rinsing |

As can be seen from Table 1, the silicon wafers rinsed using the rinsing compositions according to Examples 1 to 15 individually had a small count of particles and an excellent result of the evaluation for wettability, as compared to the silicon wafer rinsed using pure water (Comparative Example 5). This result suggests that the rinsing compositions according to Examples 1 to 15 allow the rinsed silicon wafer to maintain excellent surface wettability, suppressing the generation of particles on the surface of the rinsed wafer. The silicon wafers rinsed using the rinsing compositions according to Examples 10 and 11 each containing an alkaline compound in an amount 0.5 times or more the mass of the water-soluble polymer individually had a large count of COPs, as compared to the silicon wafer rinsed using pure water (Comparative Example 5). This result suggests that, for reducing the COPs of the rinsed silicon wafer, the amount of the alkaline compound contained in the rinsing composition is desirably at least less than 0.5 times the mass of the water-soluble polymer. The rinsing composition according to Comparative Example 4 was gelled, and therefore evaluation of the surface wettability and measurements of the particles and COPs were not able to be performed.

Examples 16 and 17

In rinsing the polished silicon wafer using the rinsing composition in Example 2, the rinsing time was changed to 30 seconds in Example 16 and to 90 seconds in Example 17. Then, with respect to each of the rinsed silicon wafers, evaluation of the surface wettability and measurements of the particles and COPs were conducted in accordance with the same procedure as that mentioned above. The results are shown in Table 3.

Comparative Examples 6 and 7

In rinsing the polished silicon wafer using pure water, the rinsing time was changed to 30 seconds in Comparative Example 6 and to 90 seconds in Comparative Example 7. Then, with respect to each of the rinsed silicon wafers, evaluation of the surface wettability and measurements of the particles and COPs were conducted in accordance with the same procedure as that mentioned above. The results are shown in Table 3.

As can be seen from Table 3, the count of particles measured in Example 16, in which the rinsing was conducted for 30 seconds, was large, as compared to that in the Example in which the rinsing was conducted for 60 seconds (see Example 2 shown in Table 1) or 90 seconds (see Example 17 shown in Table 3). This result suggests that, for suppressing the generation or particles on the surface of the rinsed wafer, the rinsing time is preferably at least 60 seconds.

The invention claimed is:

1. A rinsing composition comprising:

at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer;

a chelating agent selected from triethylenetetraminehexaacetic acid and ethylenediaminetetrakismethylenephosphonic acid; and water, wherein the rinsing composition contains no alkaline compound and no abrasive grain.

2. A method for rinsing a silicon wafer, the method comprising:

preparing a rinsing composition containing at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer, a chelating agent selected from triethylenetetraminehexaacetic acid and ethylenediaminetetrakismethylenephosphonic acid, and water, wherein the rinsing composition contains no alkaline compound and no abrasive grain; and rinsing, using the prepared rinsing composition, a silicon wafer polished using a polishing composition.

3. The method according to claim 2, wherein said polishing composition contains a water-soluble polymer of the same type as the water-soluble polymer contained in the rinsing composition.

4. A method for manufacturing a silicon wafer, the method comprising:

polishing a semi-manufactured silicon wafer using a polishing composition; and rinsing the polished semi-manufactured silicon wafer, by using a rinsing composition containing at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer, a chelating agent selected from triethylenetetraminehexaacetic acid and ethylenediaminetetrakismethylenephosphonic acid, and water, wherein the rinsing composition contains no alkaline compound and no abrasive grain.

5. The method according to claim 4, wherein said polishing composition contains a water-soluble polymer of the same type as the water-soluble polymer contained in the rinsing composition.

6. The rinsing composition according to claim 1, wherein the at least one water-soluble polymer is 0.005% by mass or more of a water-soluble polysaccharide.

7. The rinsing composition according to claim 1, wherein the at least one water-soluble polymer is 0.002% by mass or more of polyvinyl alcohol.

8. The rinsing composition according to claim 1, wherein the at least one water-soluble polymer is 0.001% by mass or more of polyethylene oxide.

9. The rinsing composition according to claim 1, wherein the at least one water-soluble polymer is 0.0005% by mass or more of polypropylene oxide.

10. The rinsing composition according to claim 1, wherein the at least one water-soluble polymer is 0.001% by mass or more of a copolymer of ethylene oxide and propylene oxide.

11. The rinsing composition according to claim 1, wherein the at least one water-soluble polymer is 0.001% by mass or more of a hydrophilic polymer obtained by adding an alkyl group or an alkylene group to a copolymer of ethylene oxide and propylene oxide.

12. The rinsing composition according to claim 6, wherein the water-soluble polysaccharide is hydroxyethyl cellulose.

13. The rinsing composition according to claim 6, wherein the water-soluble polysaccharide is pullulan.

14. A rinsing composition consisting essentially of:

at least one water-soluble polymer selected from a water-soluble polysaccharide, polyvinyl alcohol, polyethylene oxide, polypropylene oxide, a copolymer of ethylene oxide and propylene oxide, and a hydrophilic polymer obtained by adding an alkyl group or an alkylene group to said copolymer;

a chelating agent selected from triethylenetetraminehexaacetic acid and ethylenediaminetetrakismethylenephosphonic acid; and water, wherein the rinsing composition contains no alkaline compound and no abrasive grain.

* * * * *